United States Patent [19]

Ohtorii

[11] Patent Number: 5,003,341
[45] Date of Patent: Mar. 26, 1991

[54] OPTICAL INSTRUMENT OPERABLE IN A LIGHT ROOM, FOR REPRODUCING AN ORIGINAL WITH A VARIABLE MAGNIFICATION

[75] Inventor: Masakazu Ohtorii, Shiga, Japan

[73] Assignee: Dainippon Screen Mfg. Co., Ltd., Japan

[21] Appl. No.: 360,025

[22] Filed: Jun. 1, 1989

[30] Foreign Application Priority Data

Jun. 3, 1988 [JP] Japan .......................... 63-074471[U]
Jun. 3, 1988 [JP] Japan .......................... 63-074473[U]
Jun. 3, 1988 [JP] Japan .......................... 63-074474[U]

[51] Int. Cl.$^5$ ............................................. G03B 47/52
[52] U.S. Cl. ...................................... 355/43; 355/60; 355/66
[58] Field of Search .................. 355/27, 28, 43, 100, 355/71, 72, 50, 60, 66

[56] References Cited

U.S. PATENT DOCUMENTS 4,618,255 10/1986 Miyasaka et al. .................... 355/28

Primary Examiner—Michael L. Gellner
Assistant Examiner—Khanh Dang
Attorney, Agent, or Firm—Ostrolenk, Faber, Gerb & Soffen

[57] ABSTRACT

An apparatus for reproducing a picture with variable magnification under normal daylight conditions. An interceptor eliminates flare. The position of the interceptor changes as a function of the magnification. High quality images can be obtained without increasing the size of the apparatus. The apparatus also facilitates tracing of the image. The apparatus can be easily maintained.

9 Claims, 16 Drawing Sheets

OPTICAL INSTRUMENT OPERABLE IN A LIGHT ROOM, FOR REPRODUCING AN ORIGINAL WITH A VARIABLE MAGNIFICATION

BACKGROUND OF THE INVENTION

Field of the Invention and Related Art Statement

The present invention relates to an optical instrument for reproducing an original in normal daylight conditions and particularly to a camera operable in a light room, for forming an original image on photosensitive material or tracing paper with a desired magnification.

FIG. 1 is a perspective view of a conventional camera of the above mentioned type. FIG. 2 is a side view of the camera shown in FIG. 1. The camera illustrated in FIGS. 1 and 2 is capable of reproducing an original in normal daylight conditions. The camera includes: a base frame 22 which is supported stably on a floor by means of casters 20 and a main frame 24 for forming a copy image therein The main frame 24 is fixed on one end portion of the base frame 22. The camera further includes an original holder 26 which is provided on the other end portion of the base frame 22 and which is slidable toward the main frame 24. The original holder 26 holds an original to be copied such that the original is directed toward the main frame 24. A light source 28 for illuminating the original is provided on the original holder 26. A film processor 30 is provided on the main frame 24. The film processor 30 processes photosensitive film exposed in the main frame 24. A platen cover 32 covers the upper surface of the main frame and the film processor 30 to define a dark space inside. A lens holder 34 is provided on the base frame 22 between the main frame 24 and the original holder 26. The lens holder 34 is slidable between the main frame 24 and the original holder 26. The lens holder 34 holds a lens which is adapted to form a reproduced image of the original in the main frame 24. A bellows 36 connects the lens holder 34 and the main frame 24 to shield an optical path of rays passing through the lens from the environment.

The main frame 24 includes a mirror 38 provided on an optical axis from the original holder 26 and through the lens holder 34. The mirror 38 has a prescribed inclination (e.g., 45°) with respect to the optical axis. The mirror 38 reflects a beam from the original upward The main frame 24 further includes an image formation platen 40 provided on the upper surface of the main frame 24. An image of an original is formed on the upper surface of the frame 24 by the beam reflected by the mirror 38 An operation panel 42 is provided on the upper surface of the main frame 24. The operator uses the panel 42 to set the reproduction ratio or the like.

The side on which the operation panel 42 is provided is hereinafter referred to as the front side. The side on which the original holder 26 is mounted is hereinafter referred to as the back side. A frame 46 is provided on the back side of the main frame 24 and the film processor 30 is fixed on the frame 46. A photosensitive material storing box 44 for storing photosensitive material (such as photosensitive film) is provided under the film processor 30.

The cover 32 is openable and closable so that the platen 40, the storing box 44 and the film processor 30 can be shut off from external light to form a dark space. The cover 32 has a pair of operation holes 48 on its front surface into which the operator inserts his arms to handle the photosensitive film inside the cover 32. The photosensitive film is discharged from an outlet opening 50 after the film is processed by the processor 30. The operator can look though a window 52. The window 52 includes, for example, a red transparent place which covers an opening 53 formed in the platen cover 32. The window 52 intercepts rays which would cause damage to the photosensitive material.

The cover 32 can be opened to form a right angle with the upper surface of the main frame 24. The holder 26 can be rotated to a horizontal position (FIG. 2) to make it easy to place an original thereon.

FIG. 3 is a side sectional view of the film processor 30. The processor 30 includes: a drive motor 54 which is fixed on the frame 46; a developing bath 56, a fixing bath 58 and a rinsing bath 60; a drier 62; and a rotation transmission shaft 70 connected through a sprocket 66 and a chain 68 to a drive shaft 64 of the drive motor 54. The shaft 70 is supported on the lateral surfaces of the baths 56 to 60. Driven shafts 72 are supported by concave portions formed on the sides of the respective baths 56 and 60. The shafts 72 can be removed from the shaft 70. Roller rack units 74 are detachably set in each of the baths 56 to 60. A tray 80, on which a processed film is placed, is provided in the outlet opening 50 of the platen cover 32.

FIG. 4 is an enlarged cross-sectional view of the lens holder 34 shown in FIG. 2. The lens holder 34 includes a lens support 82 which is movably mounted on the base frame 22; a cylindrical lens hood 84 which is attached to the lens support 82 on the side of the main frame 24; and a long focal point type lens 86 at the center of the top end of the lens hood 84. The lens 86 faces the main frame 24 and its optical axis is directed toward the original holder 26.

In operation, to obtain a reproduction of an original with a desired magnification, an original is fixed on the original holder 26. The original is illuminated by the light source 28. Part of the light reflected from the original enters the lens hood 84 through its opening. The light passes through the lens 86 and is reflected by the mirror 38. The light reaches the platen 40.

The lens holder 34 and the original holder 26 slide on the base frame 22. When the operator sets a reproduction ratio (using the operation panel 42) the lens holder 34 and the original holder 26 move in back-and-forth directions by means of a drive unit (not shown) so that the image of the original is formed on the platen 40 with the desired magnification.

If the operator places (beforehand) a photosensitive material, such as a film, on the platen 40 for exposure, a latent image of the original is formed thereon. After exposure, the operator inserts his arms into the platen cover 32 through the operation holes 48. The operator feeds the film to the processor 30, while observing the inside of the platen cover 32 through the window 52.

The film 78 moves along the film transport path 76 within each roller rack unit 74 by the rotation of the drive motor 54 (as well as by the rotation of the transmission shaft 70 and the related driven shaft 72). The film 78 moves through the developing bath 56, the fixing bath 58, and the rinsing bath 60. The film 78 is dried by the drier 62 after it comes out of the rinsing bath 60. The processed film 78 is discharged through the outlet opening 50 and stacked on the tray 80.

If the platen cover 32 is opened (FIG. 2) and a sheet of tracing paper is placed on the platen 40 (instead of the film), the image formed on the platen 40 can be traced.

This function is utilized for various cases such as layouts of designs or captions in the design industry or formation of block copies in the plate making industry.

However, the conventional apparatus has several disadvantages. First, it is difficult to reduce the size of the conventional camera without degrading the camera's performance. The mirror 38 reduces the size of the entire apparatus by changing the optical path. However, when the camera has such a mirror 38, light from outside of the effective photographing range, but passing through the focusing lens, might be incident directly on the photographing surface or the inside of the camera. This is referred to herein as flare light. Flare light adversely affects the quality of the photographed image FIG. 5 illustrates the principle of flare generation. Referring to FIG. 5, a circle 88 represents an effective photographing range on the original holder 26. A circle 90 represents an image forming range on the platen 40. Light from the holder 26 reaches the lens 86 through the path shown by dot-dash lines. Light passing through the lens 86 is turned by the mirror 38 and converged on the platen 40.

Part of the light passing through the path shown by the hatched areas reaches the platen 40 directly, i.e., without passing through the mirror 38. These rays are not appropriately converged to form an image on the platen 40. This is flare light. The flare light adversely affects the quality of the image formed by the other light. The hatched area 92 in the circle 90 represents the range of the flare light's adverse effect.

To avoid direct incidence of flare light on the platen 40, a method of setting the effective photographing area for example to a reduced range and decreasing the size of the platen 40, or a method of increasing the distance D between the mirror 38 and the platen 40 may be considered. However, the former method fails to meet the art's need to enlarge the effective photographing area. With the latter method, it is necessary to decrease the distance between the lens 86 and the mirror 38 to obtain a prescribed magnification. The mirror 38 restricts the range of travel of the lens 86. As a result, sometimes the lens 86 cannot move to the position necessary to achieve a desired reduction because the mirror 38 obstructs the lens 86. As a result, reduction cannot be satisfactorily obtained.

Another disadvantage of the conventional camera is that it is difficult to trace an image of an original in normal daylight conditions. In the conventional apparatus, the platen cover 32 is fully opened (for example at 90°) to facilitate exchange of film cases or maintenance of the film processor 30. A large amount of light is applied from the environment to the platen 40. The light applied from the environment to the platen 40 becomes brighter than the image formed on the platen 40 by the illumination of the light source 28 As a result, the image of the original formed on the platen 40 becomes very difficult to see. This makes it difficult to trace the image of the original.

Further, the conventional camera is difficult to maintain. Generally, periodic maintenance is required for the film processor 30 to maintain high quality. The roller rack units 74 can be taken out from the baths 56, 58 and 60 to facilitate maintenance, i.e., to rinse the roller rack units 74 and the respective baths 56, 58 and 60.

But when the baths 56, 58 and 60 are to be rinsed, the electric parts and the like might be splashed with the dispersed rinsing water. Rinsing the baths 56, 58 and 60 is also troublesome.

In addition, it is not easy to clean the roller rack units 74. Particularly, in order to clean the photosensitive film transport path 74 formed in each roller rack unit 74, it is necessary to remove a guide member of the film transport path 76 from the roller rack unit 74 (by using a driver or the like).

SUMMARY OF THE INVENTION

Therefore, an object of the present invention is to provide an improved optical instrument which is operable in a lighted room and which does not present the above-described problems.

Another object of the present invention is to provide an improved optical instrument which is operable in a lighted room, and which obtains reproduced images of good quality.

The present invention relates to an optical apparatus, including: a lens for converging light from an original to form an image of the original, the lens being movable with respect to the original to change the magnification of the image; a mirror for reflecting the light from the original, the mirror being located between the lens and the image; and intercepting means for intercepting light which would otherwise reach the image without being reflected by the mirror.

The present invention also relates to an optical instrument for forming an image of an original, the optical instrument being operable during normal daylight conditions, the optical instrument including: an original holder for holding an original on a plane, the original holder being movable along a first optical axis, the first optical axis being generally perpendicular to the plane; a convex lens for transmitting light from the original to form an image of the original, the convex lens being movable along the first optical axis, the convex lens being located in front of the original holder; a mirror for reflecting light from the convex lens along a second optical axis, the mirror being located on the first optical axis in front of the convex lens; a planar image forming member which is generally perpendicular to the second optical axis, the planar image forming member being located on the second optical axis in front of the mirror so that the image of the original is formed on the planar image forming member; moving means for moving the convex lens and the original holder along the first optical axis to change the magnification of the image formed on the planar image forming member; intercepting means for intercepting light which would otherwise be transmitted directly to the planar image forming member without being reflected by the mirror; and interception drive means for moving the intercepting means in an interception direction, the interception drive means being operatively coupled with the moving means so as to move the intercepting means in the interception direction according to the magnification of the image, the interception direction intersecting the first optical axis.

The present invention also relates to an optical system, including: a frame; image forming means for forming an image of an original on an image forming surface, the image forming means being located within the frame; covering means for covering the image forming surface so as to define a dark space on the image forming surface, the covering means including a pivotable cover; and coupling means for pivotably coupling the cover to the frame so as to selectively maintain the cover in a partially open position and in a fully open position.

The present invention also relates to a system for processing photosensitive material, the system comprising: a frame; a plurality of baths for containing processing liquids for processing the photosensitive material, the baths including a developing bath, a fixing bath and a rinsing bath, the baths being detachably coupled to the frame; and feed means for feeding the photosensitive material through the baths.

The present invention also relates to a system for feeding photosensitive material through a plurality of baths so as to process the photosensitive material, the system comprising: a plurality of transport means for transporting photosensitive material along a transport path through a plurality of baths and for immersing the photosensitive material in processing liquids in the baths, each of the transport means including: (A) first guide means for guiding the photosensitive material through the baths in a first direction, the first guide means extending in a direction which intersects the transport path, the first guide means including: (a) a pair of first support frames which are parallel to each other, the support frames being located on the sides of the transport path; and (b) a first guide member for defining the first direction, the first guide member having ends which are fixed to the first support frames; (B) second guide means for guiding the photosensitive material in another direction, the second guide means being detachably coupled to the first guide means, the second guide means including: (a) a pair of second support frames which are detachably coupled to the first support frames; and (b) a second guide member for defining the another direction, the second guide member having ends which are fixed to the second support frames; and (C) feed roller means extending in a direction which intersects the transport path, the feed roller means contacting the transport path Rays of light from the original are transmitted by the convex lens unit and reflected by the mirror to form an image of the original on the image forming member. In the case of reproduction with a large magnification, the rays which would otherwise reach the image forming member without being reflected by the mirror are intercepted by the interceptor. The interceptor moves so as to change the range of the rays to be intercepted according to the degree of magnification. As a result, the image of the original is formed in good condition. Even if the size of the optical instrument is reduced, the quality of the image obtained is maintained.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 6:
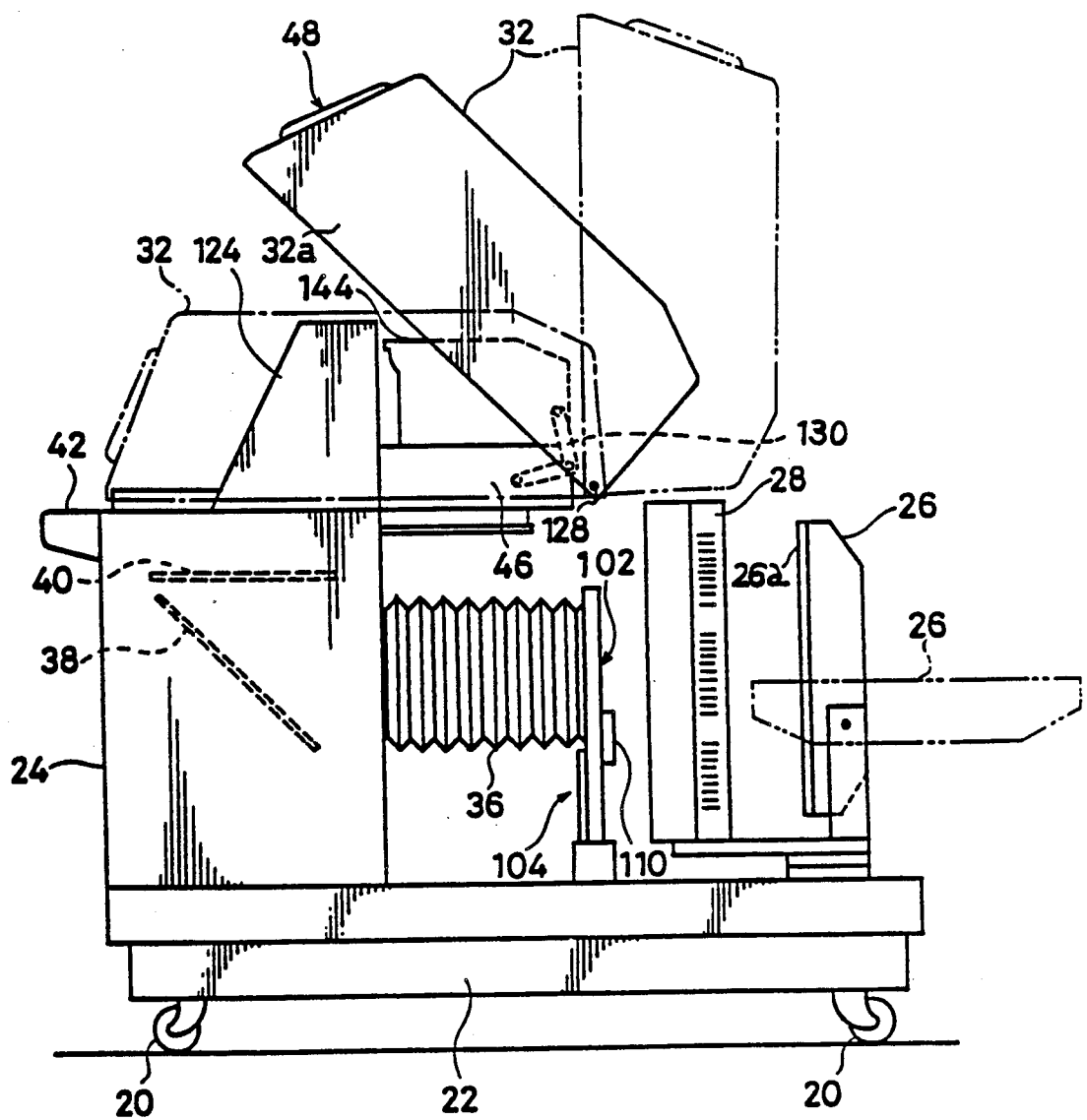
FIG. 6 is a side view of a camera according to the present invention.

Referring to FIG. 6, a camera according to the present invention includes: a base frame 22 which is stably supported on a floor by a plurality of casters 20 and a main frame 24 which is fixed on one end portion of the base frame 22. An image of an original is formed in the main frame 22. The camera further includes an original holder 26 which is slidably arranged on the other end of the base frame 22, opposed to the main frame 24. The holder 26 holds the original to be reproduced in position facing the main frame 24. The camera has a light source 28 which is fixed on the original holder 26 for illuminating the original. An improved film processor 144 processes a photosensitive film which is exposed in the main frame 24. The processor 144 is provided on the main frame 24. A platen cover 32 covers the upper surface of the main frame 24 and the film processor 144 and forms a dark room therein. An improved lens holder 102 is slidably located on the base frame 22 between the main frame 24 and the original holder 26. The holder 102 supports a lens to be used for reproduction.

Figure 7:
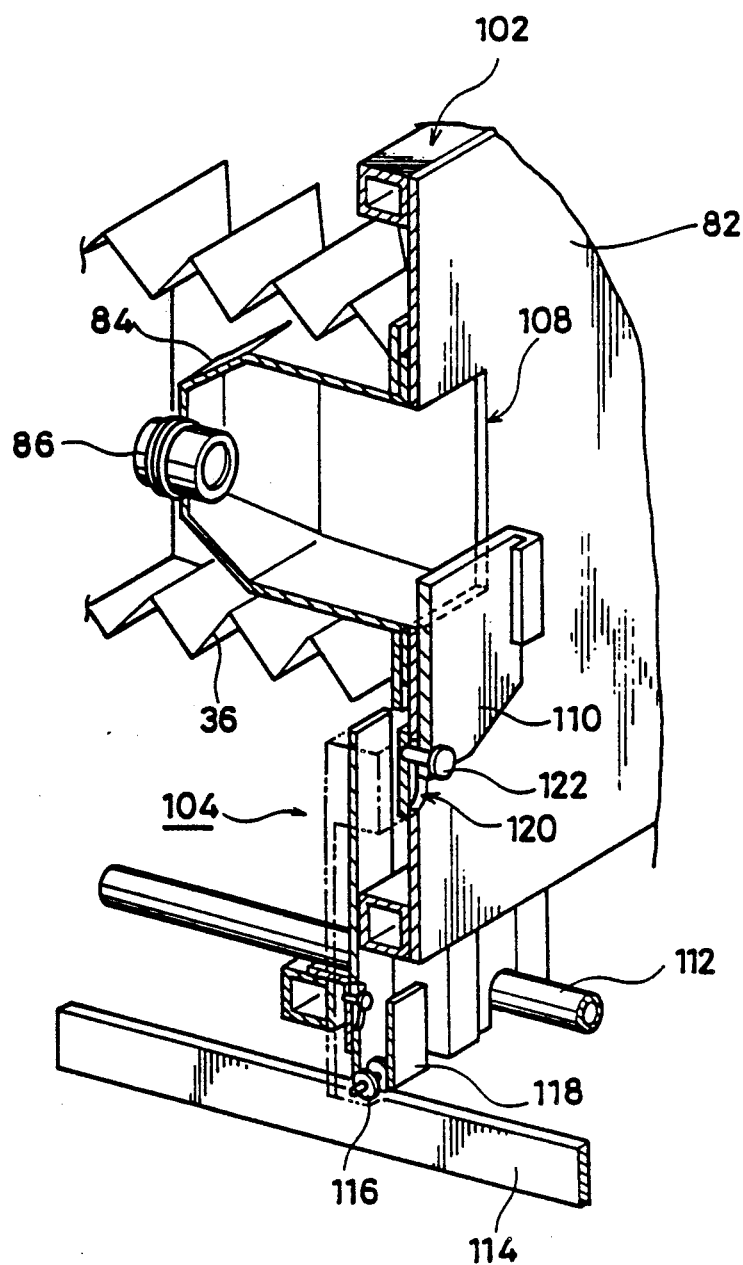
FIG. 7 is a partial fragmentary perspective view of a main part of the camera according to the present invention.
Figure 8:
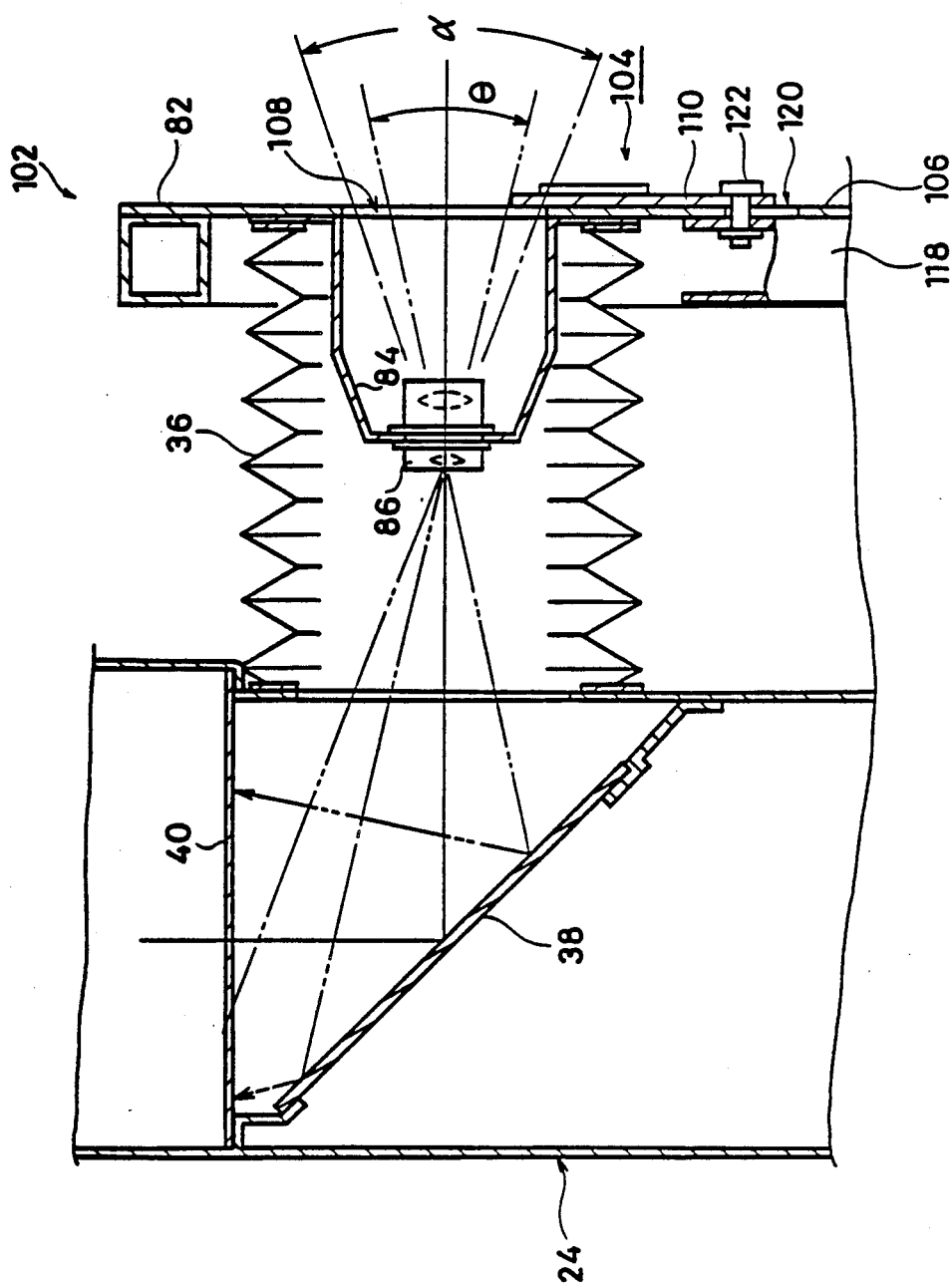
FIG. 8 is a sectional view of an optical system of the camera according to the present invention.

Referring to FIGS. 7 and 8, the lens holder 102 includes a platelike lens support 82 which slides on the base frame 22 and which has an opening through which light for reproduction is applied. A lens hood 84 is fixed on the opening of the support 82 and projects toward the main frame 24. A short focal distance lens 86 is provided on an end of the lens hood 84 nearest to the main frame 24. Bellows 36 cover the lens 86 and the lens hood 84 and connect the lens support 82 and the main frame 24 to form a dark room therein communicating with the main frame 24. A flare interceptor 104 is located in a lower portion of the lens support 82 to adjustably cover part of the opening 108 of the support 82 to intercept flare according to the reproduction magnification.

The flare interceptor 104 includes a flare interception plate 110 which is vertically movable on a wall 106 opposed to the original holder 26. The plate 110 has an upper side which is parallel to the lower side of the opening 108. A vertically movable plate cam 114 determines the height of the plate 110 according to the position of the lens support 82. The cam 114 is parallel to a guide member 112 for guiding the movement of the lens support 82. A cam follower 116 follows the cam 114 and a flare interception plate support frame 118 vertically moves the flare interception plate 110 according to the vertical movement of the cam follower 116. The upper end of the frame 118 supports the flare interception plate 110. The rotatable cam follower 116 is mounted on the lower end of the frame 118.

An elongated slot 120 is provided in a lower portion of the opening 108. The plate 110 is connected to the frame 118 by a pin 122 which is inserted into the slot 120.

Referring to FIG. 8, the main frame 24 includes an optical path change mirror 38 which is inclined by a prescribed angle, e.g., 45° with respect to the optical axis connecting the original holder 26 and the lens holder 34. Light from the original is reflected by the mirror 38 so as to direct the light upward. The image of the original is formed on a surface of an image formation platen 40 by the rays reflected by the mirror 38. An operation panel 42 for setting a reproduction ratio and the like by the operator is provided on an upper portion of the front surface of the main frame 24. Interception side plates 124 are provided on the upper surface of the main frame 24 on both sides of the platen 40. The side plates 124 intercept rays which would otherwise be incident sideways onto the platen 40.

The film processor 144 is fixed on a frame 46 provided on the main frame 24.

Figure 1:
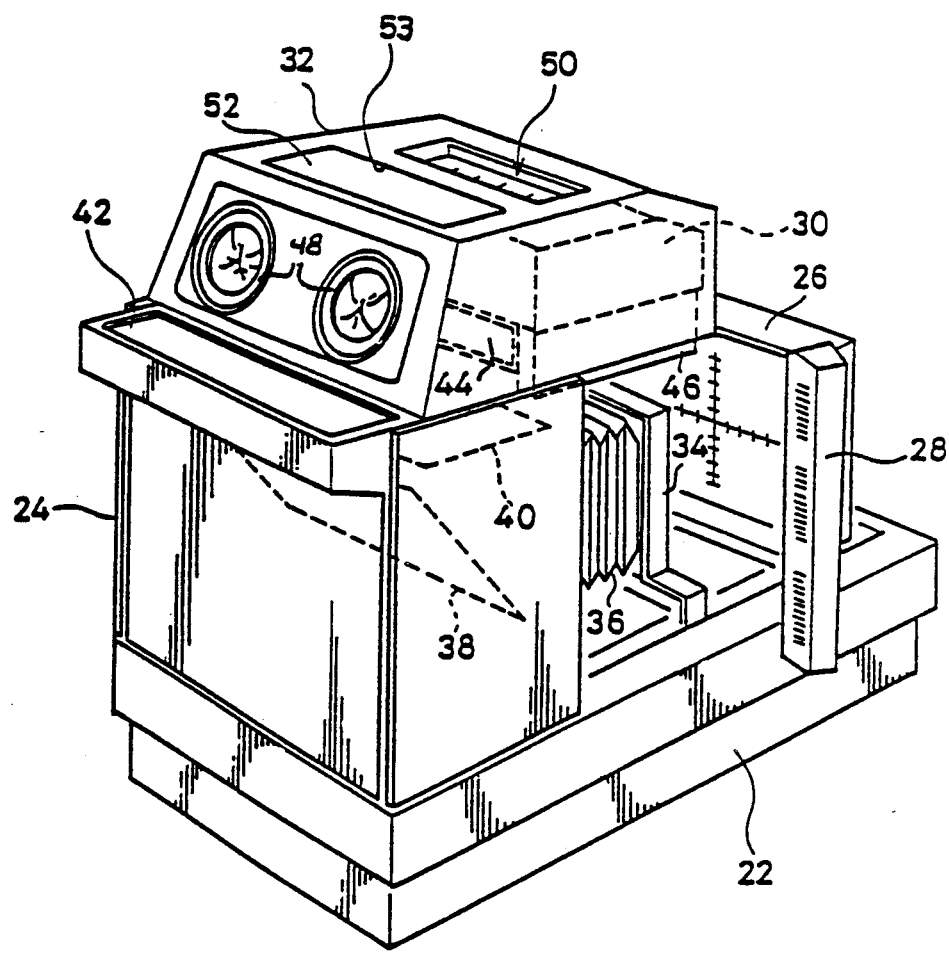
FIG. 1 is a perspective view of a conventional camera.
Figure 2:
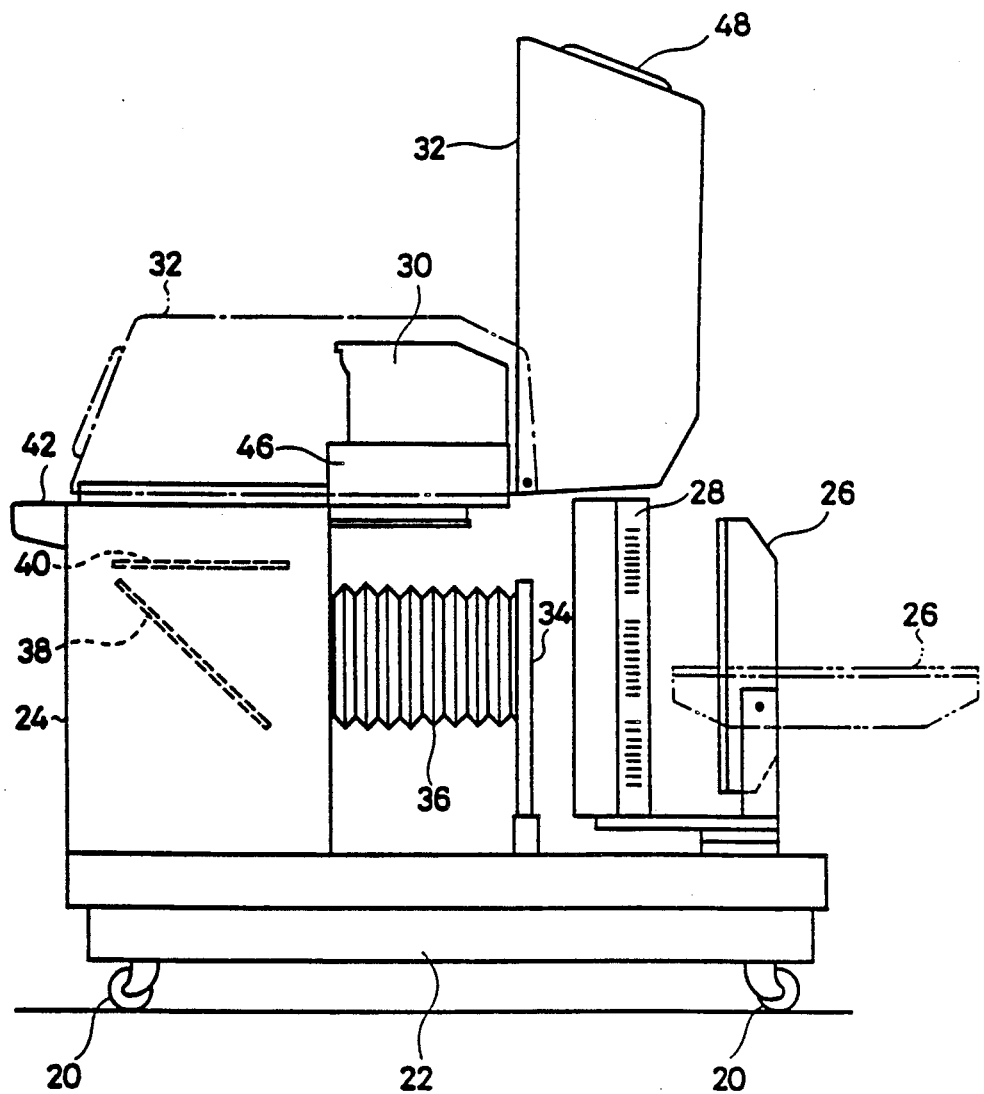
FIG. 2 is a side view of the camera of FIG. 1.
Figure 3:
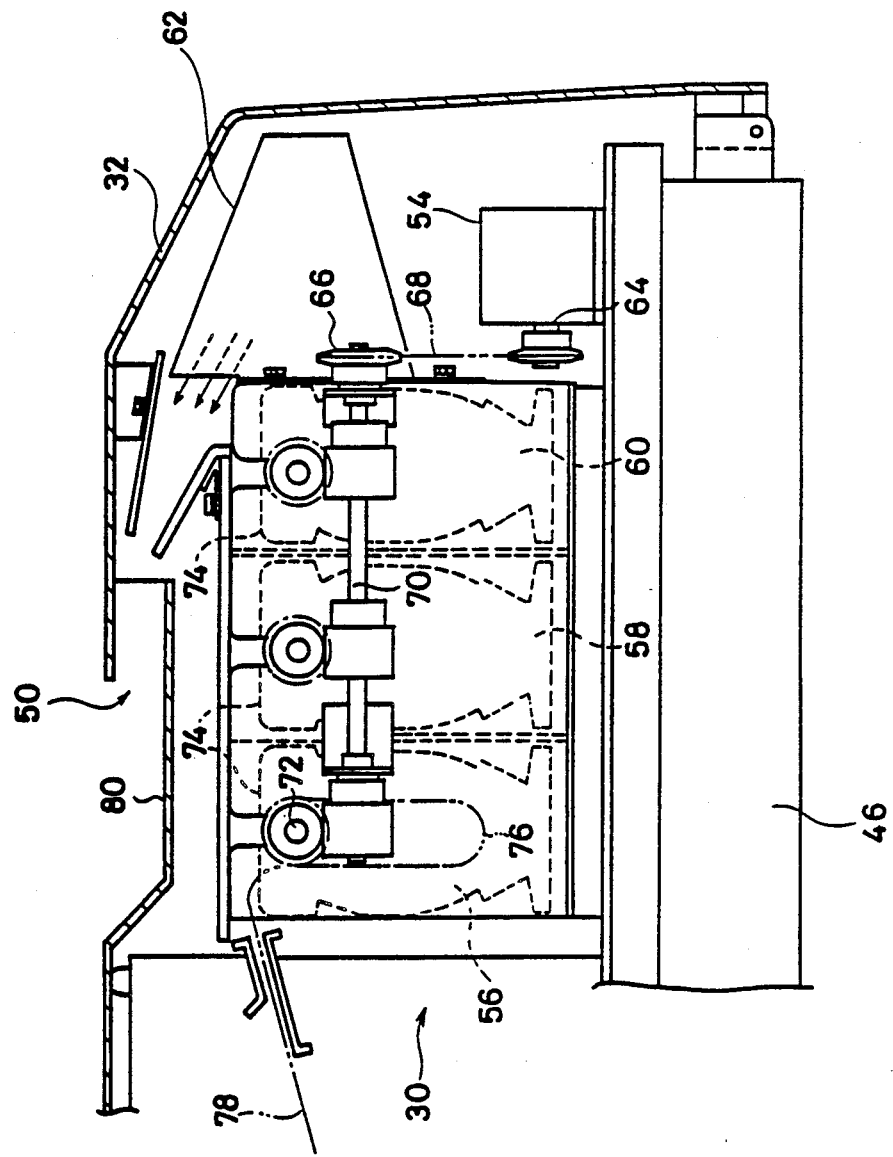
FIG. 3 is a side view of a film processor of the camera of FIG. 1.
Figure 4:
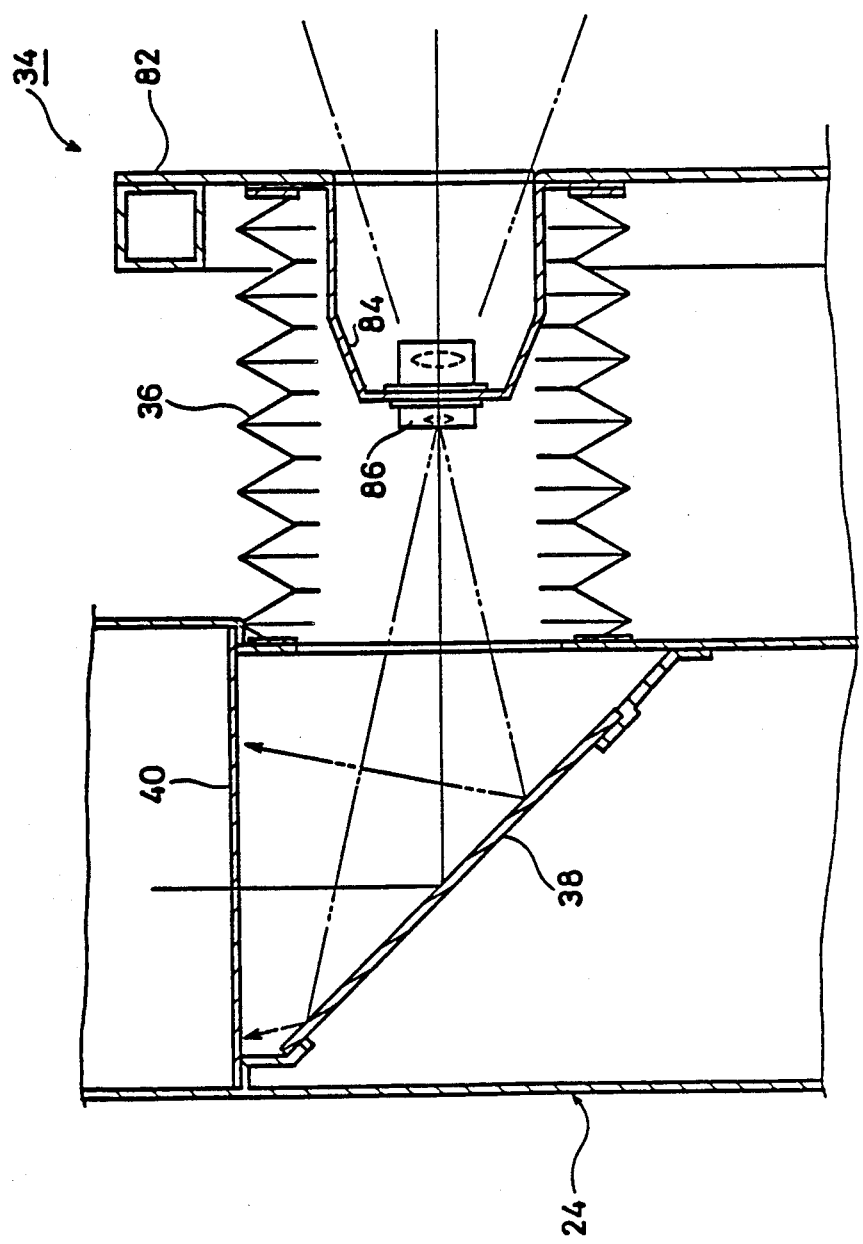
FIG. 4 is a cross-sectional view of an optical system of the camera of FIG. 1.
Figure 5:
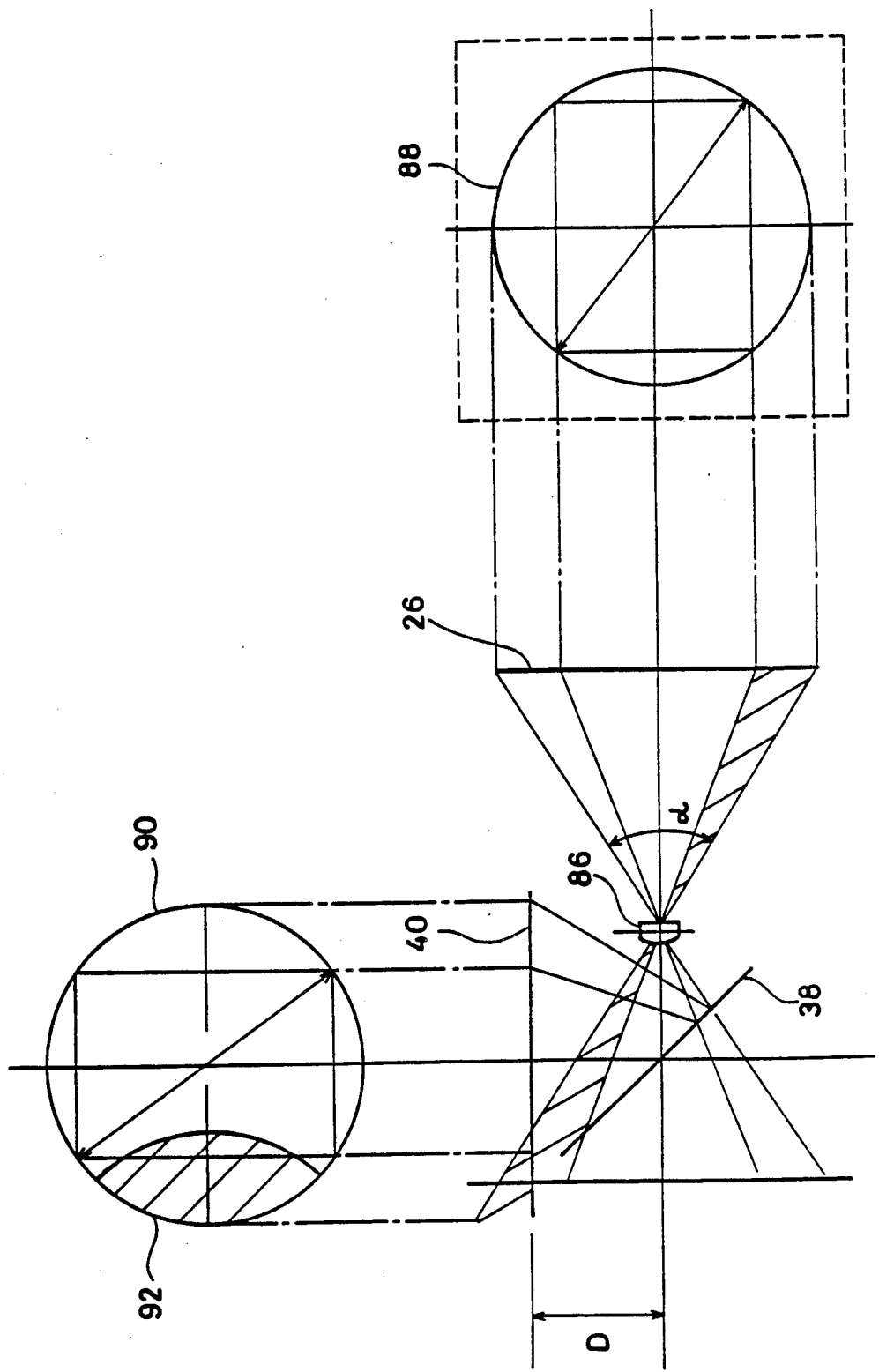
FIG. 5 is a schematic diagram of the optical system of a conventional camera.

The cover 32 has a pair of holes 48 on its front surface. The operator inserts his arms into the holes 48 to handle photosensitive material located within the cover 32. The upper surface of the cover 32 has an observation window 52 (FIG. 1), and an outlet opening 50 from which the photosensitive film processed by the film processor 30 is discharged. The window 52 is formed of transparent red-color glass, transparent red plastic, or the like. Only light having wavelengths to which the photosensitive film is not sensitive are admitted through the opening.

The light source 28 for illuminating the original is provided on the front surface of the original holder 26. But a light source for transmitting through the original from the back surface of the original holder 26 may be provided. Both the front and back light sources may be provided together to eliminate shade around a thick original.

The cover 32 is attached to an upper portion of the main frame 24 by a hinge 128. In a closed position, the cover 32 forms a dark room on the upper surface of the main frame 24 (shown by the single dotted chain lines in FIG. 6). The cover 32 can be pivoted through about 90° about the hinge 128 to a fully opened position (as shown by the double dotted chain line in FIG. 6).

The platen cover 32 has sidewalls 32a. At least one of the sidewalls 32a is coupled to the main frame 24 by means of a half-open state maintaining device 130 formed by a multistage stop stay.

Figure 9:
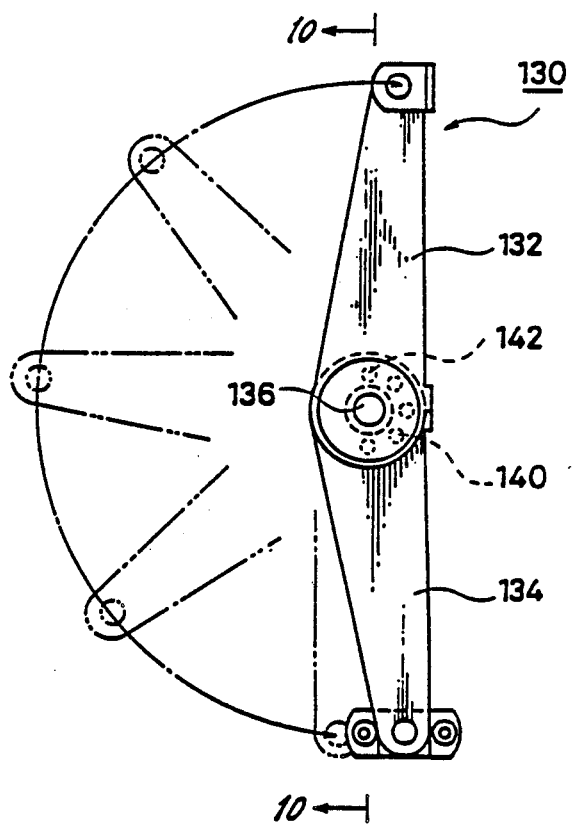
FIG. 9 is a plan view of a half-open state holder of the camera according to the present invention.
Figure 10:
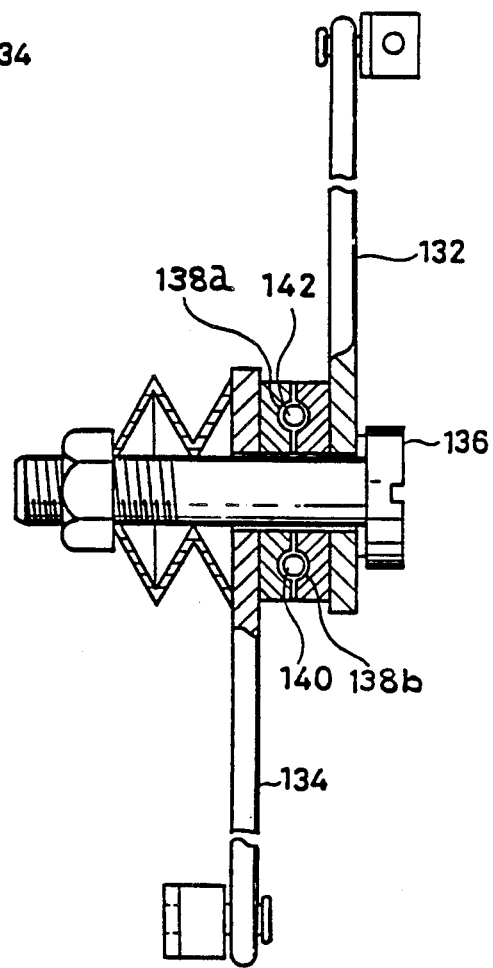
FIG. 10 is a sectional view taken along the direction X—X in FIG. 9.

Referring to FIGS. 9 and 10, the half-open state maintaining device 130 includes an arm 132. One end of the arm 132 is swingably coupled to the platen cover 32. Another arm 134 has its one end swingably coupled to the main frame 24 and a shaft 136 is swingably coupled to the free ends of the arms 132 and 134. A ball 142 is fitted in a space 140 formed by concave portions 138a and 138b in the opposing surfaces of the free ends of the arms 132 and 134.

Figure 11:
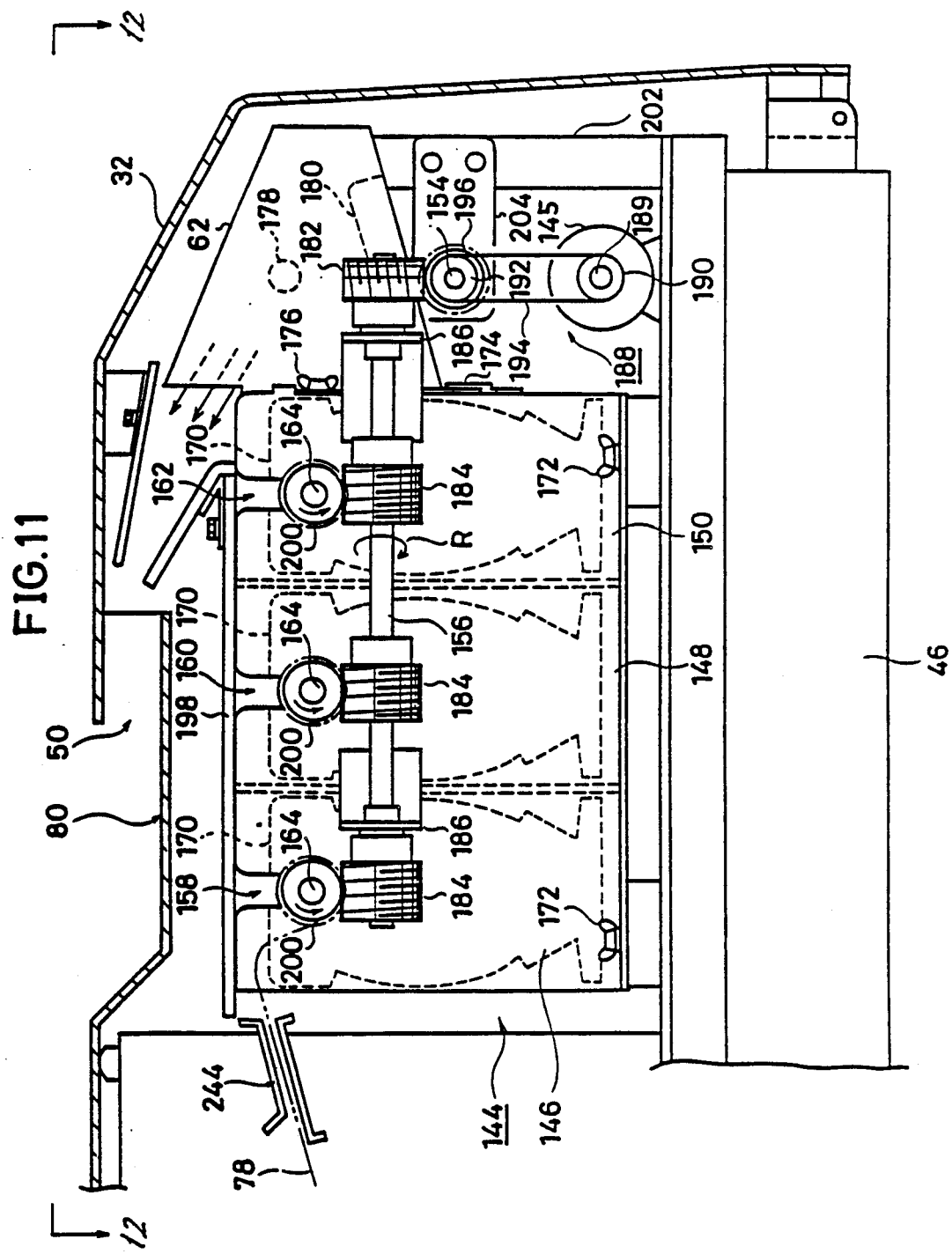
FIG. 11 is a side view of a film processor of the camera according to the present invention.
Figure 12:
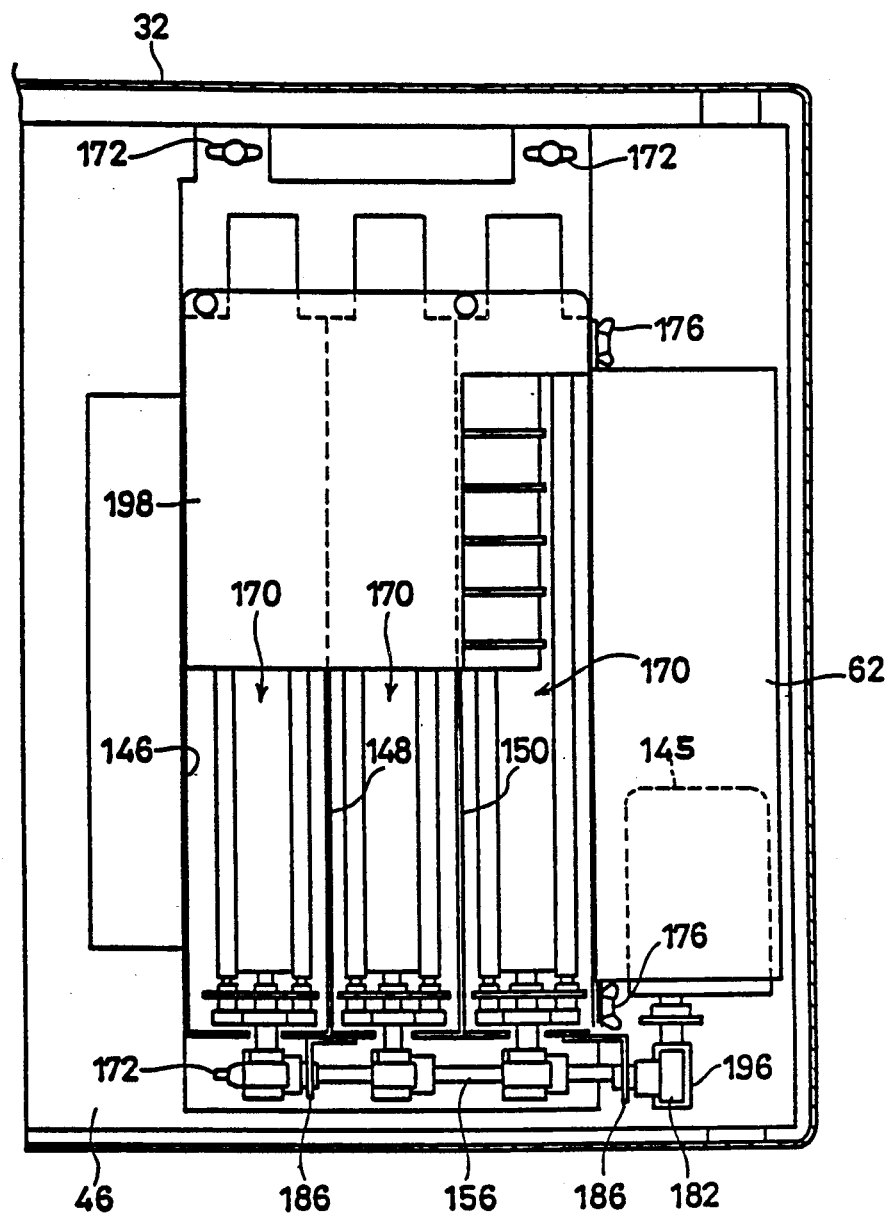
FIG. 12 is a plan view taken along the direction VII--VII in FIG. 11.

Referring to FIGS. 11 and 12, the film processor 144 includes a drive motor 145 which is fixed on the frame 46; a developing bath 146, a fixing bath 148, a rinsing bath 150; a drier 62; and a drive shaft 154 which is coupled to a rotation shaft 189 of the drive motor 145. The shaft 154 rotates according to the rotation of the drive motor 145. A rotation transmission shaft 156 has one end which is detachably coupled to the drive shaft 154. The shaft 156 is rotatably supported along the whole length of the lateral portions of the baths 146, 148 and 150. Three driven shafts 164 are rotatably supported by concave portions 158, 160 and 162. The concave portions 158, 160 and 162 are formed on both sides of the baths 146, 148 and 150. The shafts 164 are detachable from the transmission shaft 156. Roller rack units 170 are detachably set in each of the baths 146, 148 and 150. The units 170 form a prescribed path for transporting a photosensitive film 78. The outlet opening 50 and the tray 80 are provided on the platen cover 32.

The baths 146, 148 and 150 are formed as a unitary body. The unitary body is in turn detachably fixed to the frame 46 by four wing bolts 172. A fixing member 174 is provided on a side surface of the rinsing bath 150 facing the drive motor 145.

The casing of the drier 62 is supported by the fixing member 174. The two lateral portions of the casing are detachably fixed to the rinsing bath 150 by wing bolts 176. The drier 62 includes a straight tube heater 178 for heating air and a fan 180 for sending air to a processed photosensitive film.

The transmission shaft 156 has a worm wheel 182 fixed to its end (on the side of the drive shaft 154) and three worms 184 adjacent to the respective baths 146, 148 and 150.

A support member 186 for rotatably supporting the shaft 156 is provided on a lateral portion of the baths 146, 148 and 150.

The drive motor 145 and the drive shaft 154 are coupled by a transmission system 188. The transmission system 188 includes a sprocket 190 which is provided on a rotation shaft 189 of the drive motor 146, a sprocket 192 which is provided at one end of the drive shaft 154, and a chain 194 which connects the sprockets 190 and 192.

The drive shaft 154 has a worm 196 which is detachably coupled to the worm wheel 182. The baths 146, 148 and 150 are covered with an upper lid 198. A worm wheel 200 at one end of each driven shaft 164 engages with the corresponding worm 184. The drive shaft 154 is rotatably supported by a vertical member 202 and a drive shaft support member 204.

Figure 13:
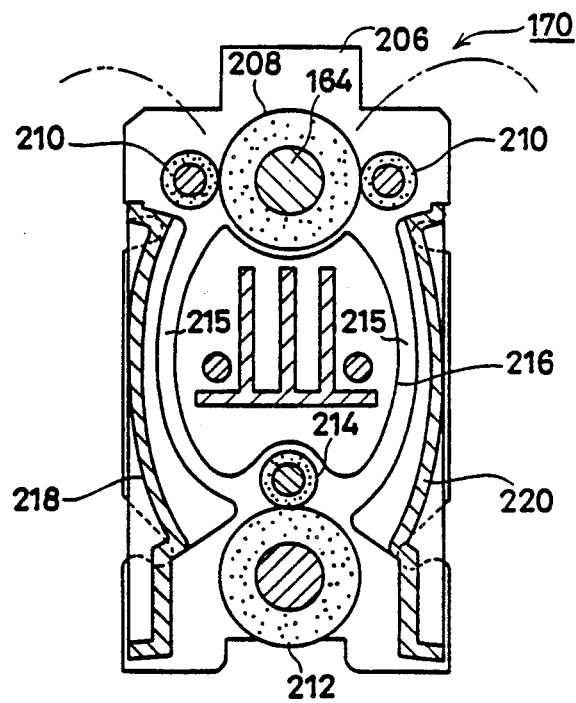
FIG. 13 is a side sectional view of a roller rack unit to be used in the film processor shown in FIG. 11.

Referring to FIG. 13, the roller rack unit 170 includes a pair of support frames 206 and an upper feed roller 208 with both of its ends rotatably supported by the support frames 206 and its central axis coupled to the driven shaft 164. Upper guide rollers 210 are parallel to and contact the upper feed roller 208. Both ends of the central axis of each guide roller 210 are rotatably supported by the support frames 206. Both ends of a lower feed roller 212 are rotatably supported by lower portions of the support frames 206. The roller 212 and the frames 206 rotate together with the corresponding driven shaft 164 by a transmission mechanism (not shown in FIG. 13). A small diameter lower guide roller 214 (with both of its ends rotatably supported by the support frames 206) rotates together with the driven shaft 164. The rollers, together with a set of guide members 216, 218 and 220, constitute a U-shaped film transport path 215. The lower feed roller 212 and the lower guide roller 214 contact each other at the lowest point of the transport path 215.

Figure 14:
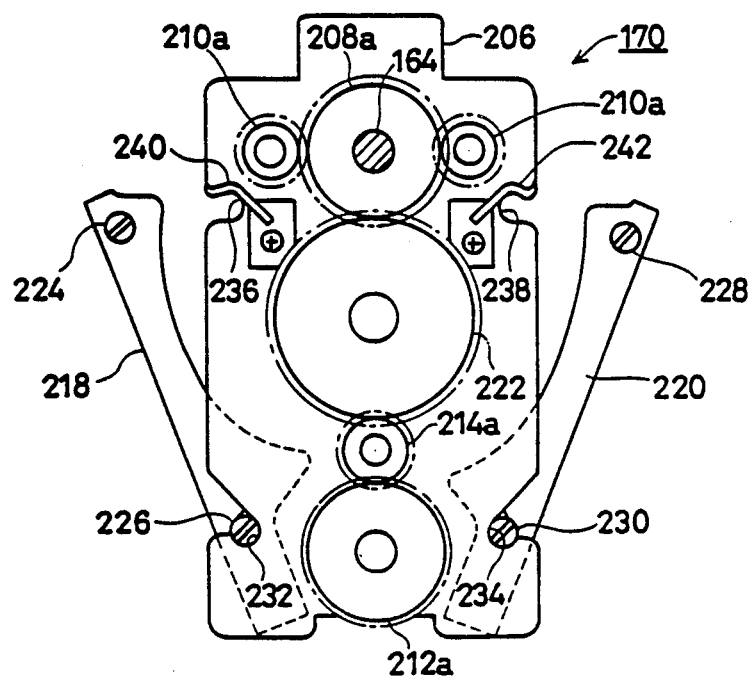
FIG. 14 is a side view of the roller rack unit shown in FIG. 13.

As illustrated in FIG. 14, the guide members 218 and 220 can be removed from the support or guide member 216. A gear 208a is provided on the shaft of the upper feed roller 208. A gear 210a which engages with the gear 208a is provided at one end of the shaft of the upper guide roller 210. A free wheel 222 engaging with the gear 208a is provided on a side surface of the central portion of the support member 206. A gear 214a engaging with the free wheel 222 is provided at one end of the shaft of the lower guide roller 214. A gear 212a engaging with the gear 214a is provided at one end of the shaft of the lower feed roller 212.

The guide member 216 is arranged inside of the U-shaped path 215. The outer guide members 218 and 220 are arranged outside of the path 215. A pin 224 is fixed on and projects from a side surface of the guide member 218 near its upper end. A pin 226 projects in the same direction as the pin 224 and is fixed on a side surface of the outer guide member 218 near its lower end. Similar pins 228 and 230 are provided on the guide member 220.

The pins 226 and 230 are slid into and supported in grooves 232 and 234 in side end portions of the support frame 206. The pins 224 and 228 are fitted into grooves 236 and 238, respectively. Snaps 240 and 242 hold the pins 224 and 228 in the grooves 236 and 238.

In operation, the original holder 26 is rotated through 90° (as shown by the double dotted chain line in FIG. 6) and the original is sandwiched between the original holder 26 and a platen glass 26a so as to be opposed to the lens holder 102. The light source 28 illuminates the original on the original holder 26.

The operator uses the operation panel 42 to set a desired reproduction ratio. The lens holder 102 and the original holder 26 move on the base frame 22 along the guide member 112 by drive means, not shown, according to the set reproduction ratio. The lens holder 102 and the original holder 26 may be positioned manually to obtain a desired magnification.

The cam follower 116 moves vertically together with the movement of the lens holder 102 according to the cam profile of the cam 114. The flare interception plate 110 moves vertically according to the vertical movement of the pin 122.

The cam profile of the cam 114 is such that the plate 110 is located at a higher position when a larger reproduction ratio is set by the lens holder 102. In other words, the flare interception plate 110 is raised to a higher position as the lens holder 102 approaches the original holder 26.

Light reaching the lens 86 from the original is permitted to enter the lens 86 through the opening 108. The light incident on the lens 86 forms a field angle $\alpha$. If the reproduction ratio is large, a field angle $\theta$ formed by the range of rays which are actually available to form an image (referred to hereinafter as "available view angle") is smaller than the field angle $\alpha$. The rays which pass through the lower of the regions but outside of the available field angle $\theta$ cause flare and deteriorate the quality of the image.

The flare interception plate 110 is raised to a higher position as the available field angle 8 decreases (i.e., as reproduction magnification is increased). The flare interception plate 110 intercepts rays which are outside of the available field angle $\theta$. All the rays having passed through the lens 86 are reflected by the mirror 38 and form an image on the upper surface of the platen 40. None of the rays which pass through the lens 86 reach the platen 40 directly (i.e., there is no flare). The image formed on the upper surface of the platen 40 is not adversely affected by flare.

If the reproduced image is to be formed on the photosensitive film, the operator closes the platen cover 32 in advance. The operator inserts his hands into the cover 32 through the holes 48 and places the photosensitive film on the platen 40. After an exposure process, the operator again inserts his hands into the cover 32 and feeds the photosensitive film to the film processor 144. The processor 144 effects a sequence of processes from development to drying and then discharges the processed photosensitive film from the outlet opening 50.

The image formed on the platen 40 is not adversely affected by flare. The quality of the image formed on the photosensitive film is always good regardless of the magnification ratio.

It is also possible to form an expanded or reduced image of the original and to form a copy thereof by manually tracing the image on tracing paper. If a copy is to be formed by tracing, the operator sets the platen cover 32 to a half-open state (as indicated at 32a in FIG. 6). The half-open state maintaining device 130 maintains the platen cover 32 in the half-open state 32a.

An angle formed between the arms 132 and 134 of the device 130 ranges from 0° to 180° according to the position of the cover 32. The concave portions 138a and 138b change their positions according to the angular position of the arms 132 and 134. When the arms 132 and 134 form a prescribed angle, the positions of the concave portions 138a and 138b coincide so that a space 140 is formed therebetween. Otherwise, the positions of the concave portions 138a and 138b do not coincide. The ball 142 normally fits in one of the concave portions 138a and 138b. The ball 142 fits stably within the space 140 formed by the concave portions 138a and 138b. This way, the ball 142 fixes the angle between the arms 132 and 134. When the operator applies force to open or close the cover 32, the ball 142 is forced out of the space 140.

If the platen cover 32 is kept in the half-open state, only a little light falls on the platen 40 from above or from the back side (as compared with the amount of light which falls on the platen 40 when the cover 32 is in the full-open state). In addition, the interception side plates 124 ensure that only a little light falls on the platen 40 from the lateral sides. Thus, unwanted light on the platen 40 from the right, left, upper and back sides is reduced.

If the operator stands in front of the main frame 24, namely, on the side of the operation panel 42 for tracing work, unwanted light from the front side onto the platen 40 is intercepted by the body of the operator.

Accordingly, the amount of light incident on the platen 40 from the environment becomes sufficiently small such that the light incident on the platen 40 from the lower side and the image formed on the platen 40 can be clearly observed in normal daylight conditions. Thus, the image formed on the platen 40 can be traced on tracing paper placed on the platen 40 more easily than is possible with the conventional apparatus.

The interception side plates 124 need not be fixed on the upper surface of the main frame 24. For example, the interception side plates may be fixed to a lower portion of the cover 32. Interception side plates can be stored in the main frame 24 and moved up and down simultaneously with the opening and closing of the cover 32.

During operation of the improved film processor 144, the photosensitive film 78 is fed to the film processor 144 through the photosensitive film supply opening 244. The drive motor 145 and the rotating shaft 189 transmit rotation to the drive shaft 154 through the transmission system 188. The engagement between the worm 196 and the worm wheel 182 enables the transmission shaft 156 to rotate in the direction shown by the arrow R in FIG. 11.

Rotation of the shaft 156 is transmitted to the shafts 164 by the worms 184 and the worm wheels 200. The driven shafts 164 in turn cause the respective upper feed rollers 208 to rotate in a prescribed direction. Rotation of the shaft 156 is transmitted through the upper guide rollers 210, the lower feed rollers 212 and the lower guide rollers 214 by the gears 208a, 210a, 212a and 214a and the free wheels 222.

The photosensitive film is guided from the position of contact between one of the upper guide rollers 210 and the upper feed roller 208 to one of the transport paths 215. The photosensitive film passes between the lower feed roller 212 and the lower guide roller 214 and enters the other transport path 215. The film is discharged from the position of contact between the roller 210 and the roller 208 to the outside unit 170.

The film is immersed in the processing liquids in the baths 146, 148 and 150 while it passes through the unit 170. The film is first immersed in developer in the developing bath 146. Then, the film is immersed in fixing liquid in the fixing bath 148. Finally, the film is rinsed in the rinsing bath 150. After it is dried by hot air generated by the heater 178 and blown by the fan 180, the processed film is discharged from the outlet opening 50 and stacked on the tray 80.

To maintain the film processor 144, the liquids are removed from the baths 146, 148 and 150. After the cover 32 is fully opened, the upper lid 198 is removed. The roller rack units 170 are removed from the baths 146, 148 and 150. The outer guide members 218 and 220 can be removed from each roller rack unit 170 as shown in FIG. 14. First, the pins 224 and 228 are released from the snaps 240 and 242. The guide members 218 and 220 are then pivoted on the respective pins 226 and 230 and dismounted from the support frames 206.

Removal of the guide members 218 and 220 from the support frames 206 makes it very easy to clean or inspect the parts attached to the guide members 218, 220 and 216 and to the support frame 206.

The wing bolt 176 is loosened and the drier 62 is removed from the film processor 144 so that the drier 62 can be inspected and cleaned.

Finally, the four wing bolts 172 are removed and the baths 146, 148 and 150 are removed as a unitary body.

The removed baths 146, 148 and 150 are transported to a rinsing spot (which is distant from the main body of the camera) where they are inspected and cleaned. Since the rinsing spot is distant from the camera, there is no danger to the main body of the camera, its wiring and the like. The removability of the baths 146, 148 and 150 makes cleaning and inspection very easy.

After cleaning and inspection, the parts are remounted in the film processor 144 in the reverse order from which they were disassembled.

Thus, according to the present invention, it is possible to reproduce an original with high quality and with a wide range of magnification by intercepting flare without increasing the size of the apparatus. The ability to keep the cover 32 in a half-open state makes it easy to trace an image of an original. The interception side plates 124 also make it easy to trace an image of an original. Since maintenance of the film processor 144 is simple, photosensitive film can be processed by the film processor 144 under optimum conditions. As a result, the quality of the reproduced image obtained by the processor 144 is improved. Thus, according to this embodiment, it is possible to provide a camera which operates in a lighted room which is capable of high quality image reproduction with a wide range of magnification, has good operability and maintainability and is applicable to various fields.

Figure 15:
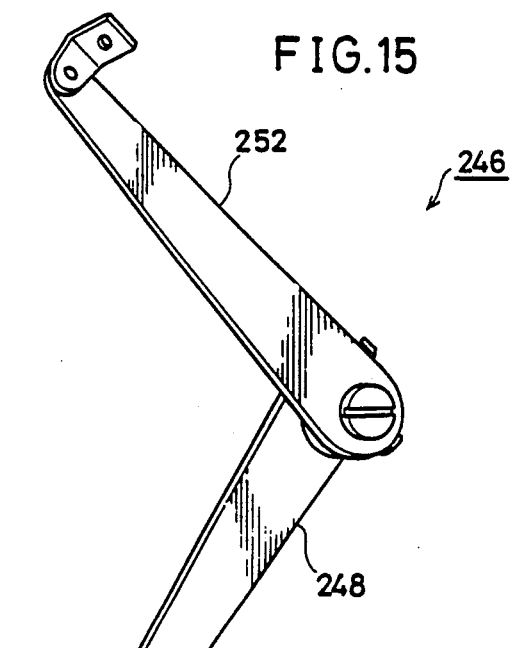
FIG. 15 is a perspective view of a half-open state holder to be used in a camera according to another embodiment of the present invention.
Figure 16:
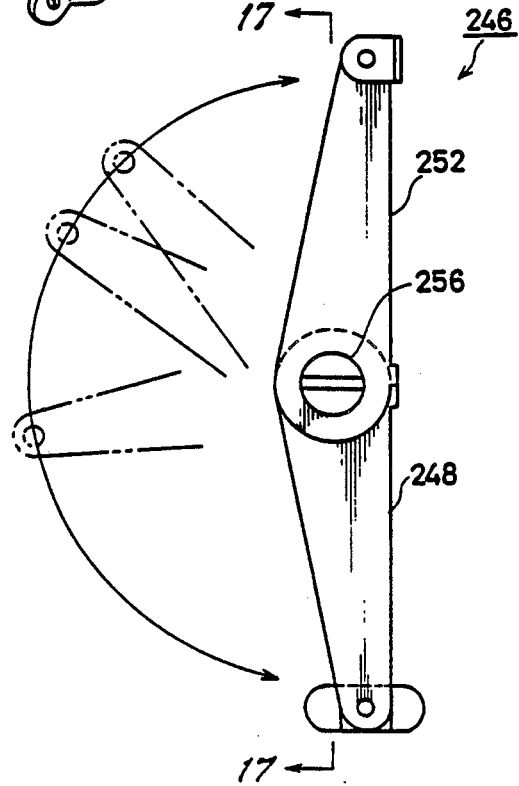
FIG. 16 is a plan view of the half-open state holder of FIG. 15.
Figure 17:
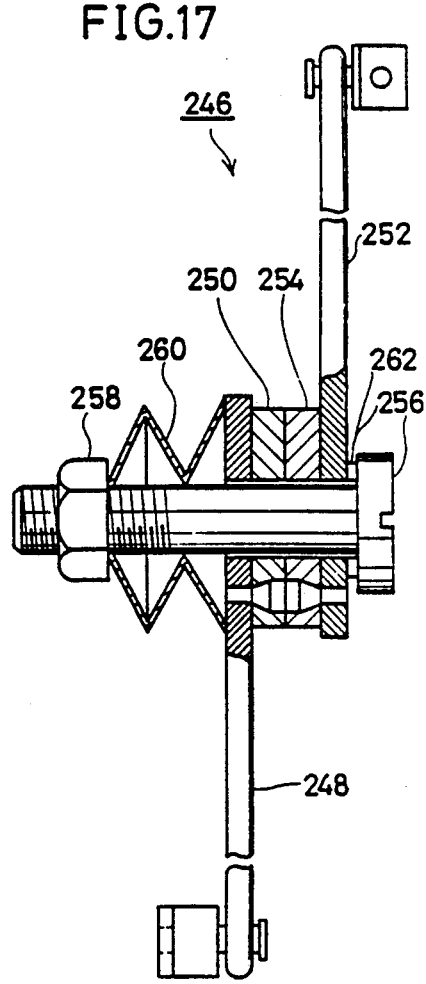
FIG. 17 is a sectional view taken along the direction of XVII—XVII in FIG. 16.

The present invention is not limited to the above-described embodiment. For example, in place of the half-open state maintaining device 130, a half-open state maintaining device 246 as shown in FIGS. 15 to 17 may be used.

The half-open state maintaining device 246 includes an arm 248 having one end which is swingably coupled to the frame 46, a circular friction plate 250 fixed on a surface of the other end of the arm 248, an arm 252 having one end which is swingably coupled to the platen cover 32, and a circular friction plate 254 which is fixed on a surface of the other end of the arm 252 facing the arm 248. A through hole is provided at the center of the friction plate 250 and the arm 248. A through hole is also provided at the center of the friction plate 254 and the arm 252.

The device 246 further includes a shaft 256 which is inserted in the through holes of the arm 252, the friction plates 254 and 250, and the arm 248. The shaft 256 has a threaded portion which projects from the arm 248. A belleville spring 260 is provided in a portion of the rotating shaft 256 which projects from the arm 248. The spring 260 presses the two friction plates 250 and 254 together. A U nut 258 engages the threaded portion of the shaft 256 to fix the spring 260. A thrust washer 262 is located between the shaft 256 and the arm 252 to reduce friction.

The friction plates 250 and 254 are pressed against each other by the spring 260. The cover 32 is maintained in a half-open state at an arbitrary angle with respect to the main frame 24 by the friction between the plates 250 and 254.

Figure 18:
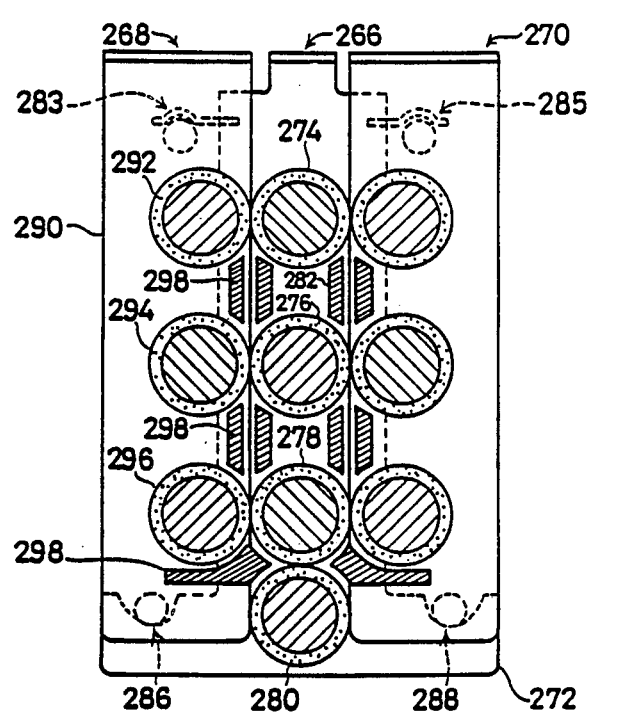
FIG. 18 is a side sectional view of a roller rack unit for use in a camera according to another embodiment of the present invention.
Figure 19:
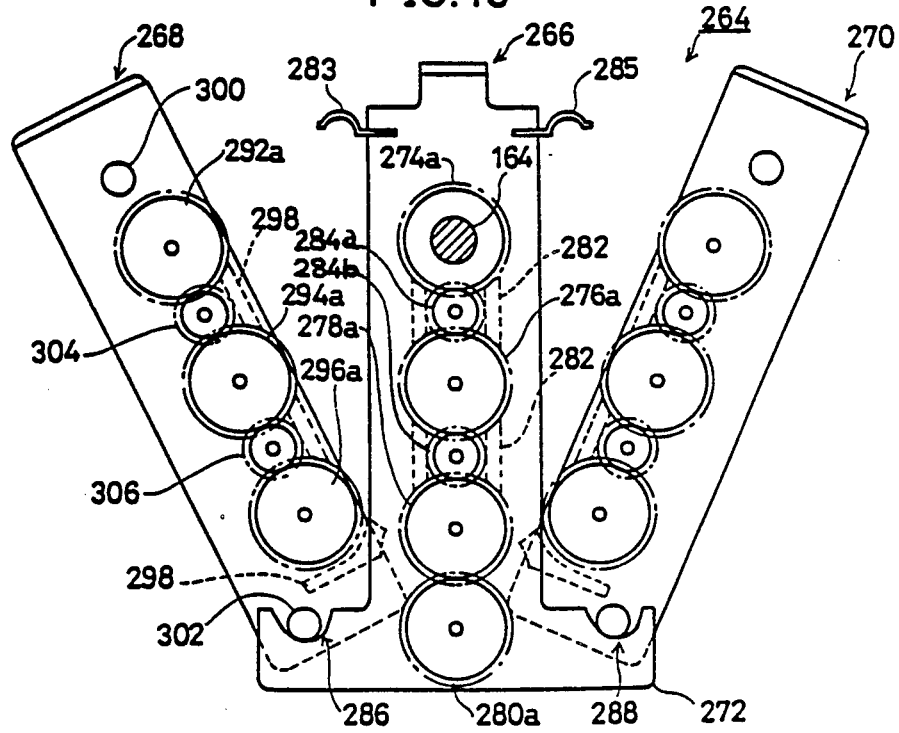
FIG. 19 is a side view of the roller rack unit shown in FIG. 18.

Referring to FIGS. 18 and 19, an alternative roller rack unit 264 includes a central guide member 266 for guiding the photosensitive film in the processing bath, and side guide members 268 and 270 on both sides of the central guide member 266, for forming a photosensitive film transport path between the side guide members and the central guide member 266.

The central guide member 266 includes a pair of central support frames 272. The frames 272 are shaped like reversed "T"s. A feed roller 274 is rotatably supported between central upper portions of the frames 272 at both ends thereof. The axis of the feed roller 274 is coupled to the driven shaft 164. Both ends of a guide roller 276 are rotatably supported between the central support frames 272 at a lower position. The guide roller 276 is spaced apart from the feed roller 274 by a prescribed distance. A guide roller 278 (with both of its ends rotatably supported between the central support frames 272 at a lower position) is spaced apart from the guide roller 276 by a prescribed distance. A guide roller 280 contacts the guide roller 278 from below and is rotatably supported at both of its ends between the pair of central support frames 272. A guide 282 provided among the feed roller 274 and the guide rollers 276 and 278 defines a transport path for the photosensitive film.

Gears 274a, 276a, 278a and 280a are provided on the shafts of the feed roller 274, and guide rollers 276, 278 and 280, respectively, in portions thereof which extend outside from the corresponding central support frame 272. Free wheels 284a and 284b are provided between the gears 274a and 276a, and between the gears 276a and 278a, respectively.

Snaps 283 and 285 for holding the side guide members 268 and 270 in place are provided on each side of each central support frame 272. Grooves 286 and 288 are provided on the lower extending portions of each central support frame 272.

The side guide member 268 includes a pair of side support frames 290 and three guide rollers 292, 294 and 296 rotatably supported between the frames 290. Guides 298 provided between the guide rollers 292 and 294, between the guide rollers 294 and 296 and below the guide roller 296. Pins 300 and 302 are provided on a surface near the upper end of each side support frame 290 and on a surface near the lower end thereof, respectively.

Gears 292a, 294a and 296a are provided on end portions of the shafts of the guide rollers 292, 294 and 296. The gears 292a, 294a and 296a extend from each side support frame 290. Free wheels 304 and 306 are provided on each side support frame 290, between the gears 292a and 294a and between the gears 294a and 296a, respectively.

The side guide member 268 is attached to the central guide member 266 as follows: The pin 302 is fitted in the groove 286. As the side guide member 268 is pivoted on the pin 302, the pin 300 is fitted in the snap 283. The side guide member 268 is detachably fixed to the central guide member 266 by the pins 300 and 302, the groove 286 and the snap 283.

When the side guide member 268 is fixed to the central guide member 266, the gear 292a engages with the gear 274a. The guides 282 and 298 are opposed to each other to form the transport path of the photosensitive film.

The side guide member 270 has the same structure as the side guide member 268.

In operation, rotation of the driven shaft 164 causes the feed roller 274 and the gear 274a to rotate. Since the gears engage with each other, the gears rotate in the prescribed directions. The guide rollers 276, 278, 280, 292, 294 and 296 as well as the guide rollers provided on the side guide member 270 rotate according to the rotations of the gears fixed on the shafts of the respective guide rollers.

The photosensitive film is supplied to the roller rack unit 264 from above through the guide roller 292 and the feed roller 274. The film is fed by the respective rotating guide rollers in the transport path. The film passes between the guide rollers 278 and 280 at the lowest point of the transport path. Then, the film is transported upwardly between the central guide member 266 and the side guide member 270, so that it is discharged.

Maintenance of the film processor 144 can be carried out easily and reliably by disassembling the central guide member 266 and the side guide members 268 and 270. Advantageously, photosensitive film can be easily taken out of such a dismountable roller rack unit, even if the film is jammed in the unit.

As is evident from the foregoing description, an improved camera which operates in a lighted room can be provided with a roller rack unit having a transport path formed only by the guide rollers and the guides as illustrated in FIGS. 18 and 19.

Figure 20:
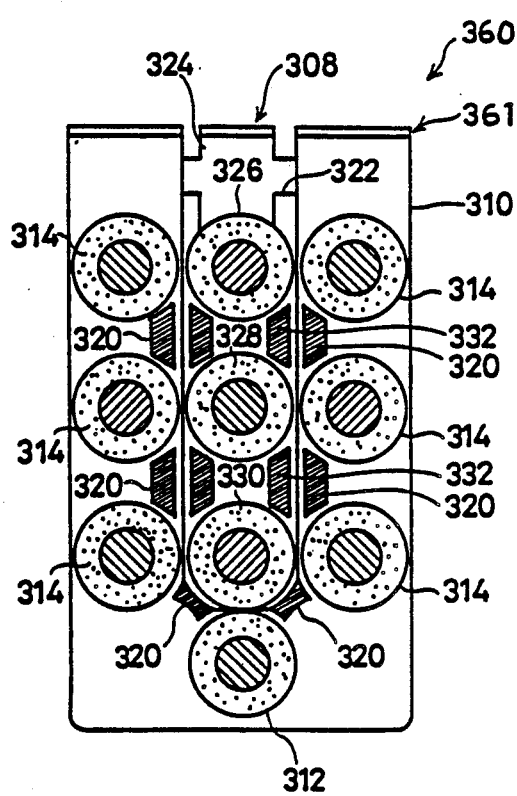
FIG. 20 is a side sectional view of a roller rack unit for use in a camera according to another embodiment of the invention.
Figure 21:
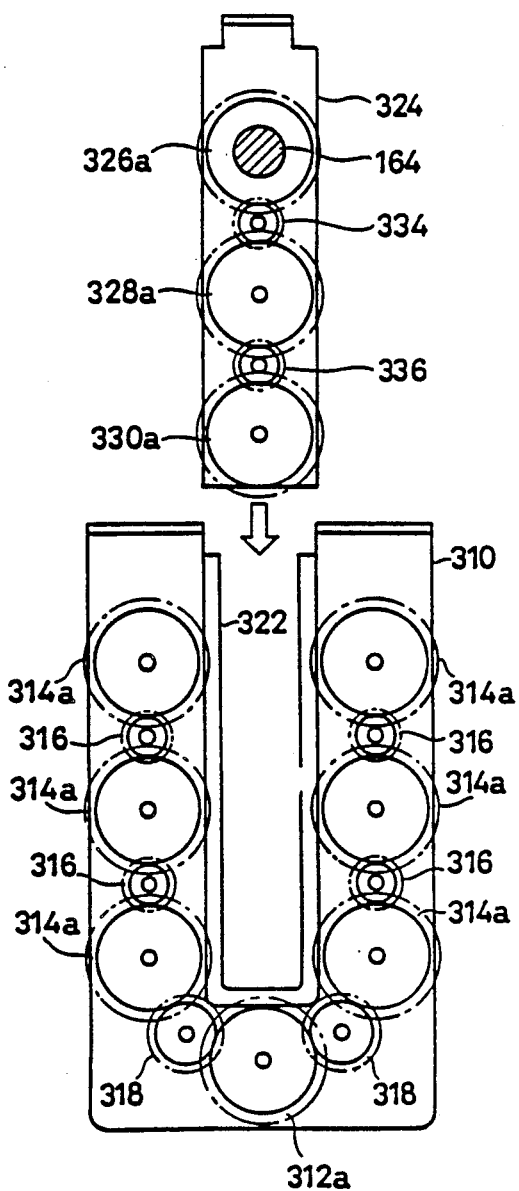
FIG. 21 is a side view of the roller rack unit shown in FIG. 20.

Referring to FIGS. 20 and 21, an alternative roller rack unit 360 includes an outer guide member 361 for defining a transport path for a photosensitive film from outside, and an inner guide member 308 detachably provided at the center, in the direction perpendicular to the plane of the drawing, of the outer guide member 361, for defining the transport path from inside.

The outer guide member 361 includes a pair of U-shaped outer support frames 310, a lower feed roller 312 provided at the bottom of the outer support frames 310 and rotatably supported between the outer support frames 310, three guide rollers 314 provided in each arm portion of the outer support frames 310, and guides 320 provided between the respective guide rollers for defining the outside of the transport path. The guide rollers 314 form three pairs. The guide rollers 314 of each pair are at an equal level.

Gears 312a and 314a are provided on respective portions of the shafts of the feed roller 312 and the guide rollers 314. The gears 312a and 314a extend from the outer guide member 361. Free gears 316 and 318 are provided on the outer guide member 361. The gears 316 and 318 are between the respective adjacent gears 312a and 314a. The gears 312a, 314a, 316 and 318 engage with each other.

A slot 322 is formed in the inner surfaces of the outer support frames 310. The inner guide member fits within the slot 322.

The inner guide member 308 includes a pair of inner support frames 324. A shaft of an upper feed roller 326 is rotatably supported at both ends thereof by upper ends of the inner support frames 324. Two guide rollers 328 and 330 are rotatably supported at both ends thereof between the inner support frames 324. Guides 332 are provided between the upper feed roller 326 and the guide roller 328 and between the guide rollers 328 and 330. The guides 332 define the inside of the transport path. The shaft of the upper feed roller 326 is coupled to the corresponding driven shaft 164.

Gears 326a, 328a and 330a are fixed on respective portions of the shafts of the upper feed roller 326 and the guide rollers 328 and 330, extending from the respective inner support frames 324. Each of the inner support frames 324 further includes a free gear 334 which is provided between the gears 326a and 328a. The gear 334 engages with the gears 326a and 328a. A free gear 336 is provided between the gears 328a and 330a and engages with the gears 328a and 330a.

Figure 22:
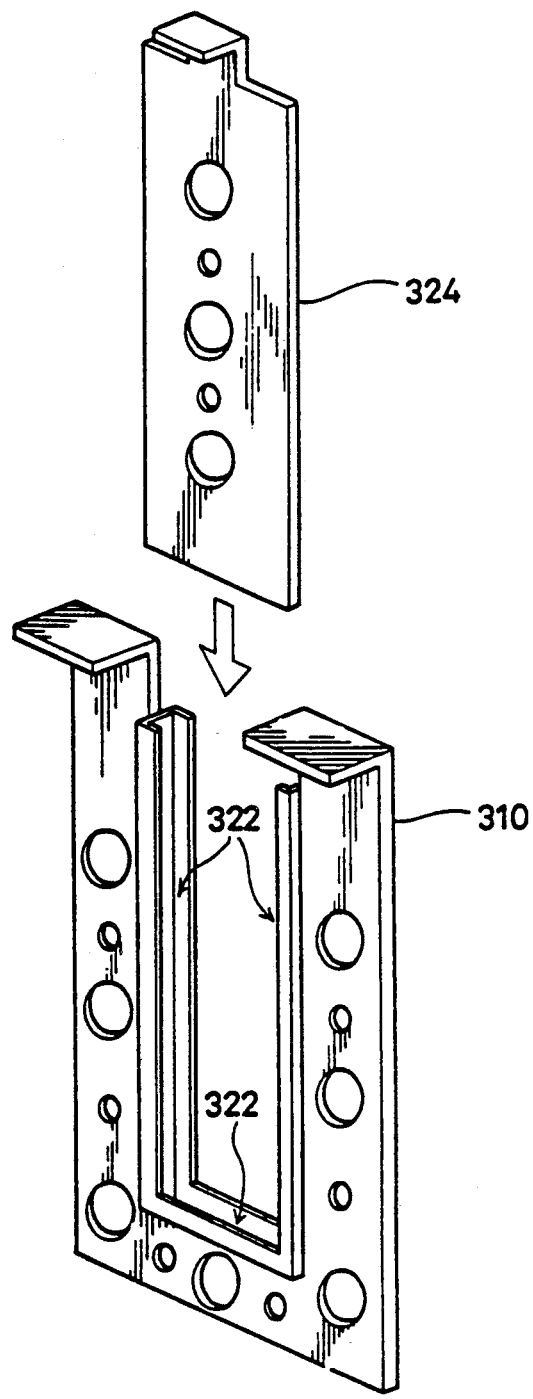
FIG. 22 is a schematic perspective view of the roller rack unit shown in FIGS. 20 and 21.

Referring to FIG. 22, a slot 322 is provided inside the outer support frame 310. The inner support frame 324 is inserted from above into the central concave portion of the outer support frame 310. The outer peripheries of the inner support frame 324 are supported by the slot 322. If the operator pulls the upper end of the inner support frame 324 upwardly, the inner support frame 324 can be easily detached from the outer support frame 310.

If the inner support frame 324 is attached to the outer support frame 310, the upper feed roller 326 contacts the corresponding guide rollers 314 on both sides. The guide roller 328 contacts the corresponding guide rollers 314 on both sides. The guide roller 330 contacts the corresponding guide rollers 314 on both sides and contacts the guide roller 312 at the lowest point. The gear 326a engages with the corresponding gears 314a on both sides. The gear 328a engages with the corresponding gears 314a on both sides. The gear 330a engages with the corresponding gears 314a and 312a.

In operation, the upper feed roller 326 and the gear 326a rotate according to the rotation of the corresponding driven shaft 164. The guide rollers 328 and 330 rotate in the same direction as that of the upper feed roller 326 by transmitting power through the gears 334, 328a, 336 and 330a.

The guide rollers 314 and 312 and the driven shaft 164 rotate in opposite directions by the engagements of the respective gears.

A U-shaped transport path is formed by connecting the positions of contact of the guide rollers 314 and 312 with the upper feed roller 326 and the guide rollers 328 and 330. The photosensitive film is supplied to the roller rack unit 360 through one of the two positions of contact between the upper feed roller 326 and the guide rollers 314. The film is transported by the respective guide rollers while it is guided in the U-shaped transport path by the guides 320 and 332. The film is discharged from between the upper feed roller 326 and the related guide roller 314.

The inner guide member 308 is detachable from the outer guide member 361, so that the transport path can be uncovered. Maintenance work, such as cleaning of the transport path, can be carried out very easily because the hands of the operator can easily reach the transport path. Accordingly, the operability of the film processor 144 using the above-described roller rack units 360 is improved and an easy to handle camera which operates in a lighted room can be provided.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An optical instrument for forming an image of an original, said optical instrument being operable during normal daylight conditions, said optical instrument comprising:
   an original holder for holding an original on a plane, said original holder being movable along a first optical axis, said first optical axis being generally perpendicular to said plane;
   a convex lens for transmitting light from said original to form an image of said original, said convex lens being movable along said first optical axis, said convex lens being located in front of said original holder;
   a mirror for reflecting light from said convex lens along a second optical axis, said mirror being located on said first optical axis in front of said convex lens;
   a planar image forming member which is generally perpendicular to said second optical axis, said planar image forming member being located on said optical axis in front of said mirror so that said image of said original is formed on said planar image forming member;
   moving means for moving said convex lens and said original holder along said first optical axis to change the magnification of said image formed on said planar image forming member;
   intercepting means for intercepting light which would otherwise be transmitted directly to said planar image forming member without being reflected by said mirror, said intercepting means being located between said original holder and said lens; and
   interception drive means for moving said intercepting means in an interception direction, said interception drive means being operatively coupled with said moving means so as to move said intercepting means in said interception direction according to said magnification of said image, said interception direction intersecting said first optical axis.

2. The optical instrument of claim 1, wherein said interception drive means includes a cam and a cam follower, said cam follower being fixed to said intercepting means, said cam follower following said cam so as to change the position of said intercepting means according to said magnification of said image.

3. The optical instrument of claim 2, wherein said image forming member includes a light transmitting image forming surface.

4. The optical instrument of claim 3, further comprising covering means for covering said image forming plate so as to define a dark space on said image forming surface.

5. The optical instrument of claim 4, further comprising a frame, said mirror and said image forming surface being located within said frame, said covering means including a pivotable cover and coupling means for pivotably coupling said cover to said frame so as to selectively maintain said cover in a partially open position and in a fully open position.

6. The optical instrument of claim 5, wherein said covering means includes plates for intercepting light which would otherwise reach said image forming surface when said cover is in said partially open position, said plates being located in the vicinity of said image forming surface.

7. The optical instrument of claim 5, wherein said image forming member includes means for holding photosensitive material in contact with said image forming surface to form a latent image of said original on said photosensitive material.

8. The optical instrument of claim 7, further comprising processing means for processing said photosensitive material, said processing means being located within said covering means.

9. The optical instrument of claim 8, wherein said processing means includes:
   a frame;
   a plurality of baths for containing processing liquids for processing said photosensitive material, said baths including a developing bath, a fixing bath and a rinsing bath, said baths being detachably coupled to said frame; and
   feed means for feeding said photosensitive material through said baths.

* * * * *